United States Patent

Manteiga et al.

(10) Patent No.: US 6,401,448 B1
(45) Date of Patent: Jun. 11, 2002

(54) SYSTEM FOR MOUNTING AIRCRAFT ENGINES

(75) Inventors: John Alan Manteiga, North Andover; Christopher James Wilusz, Peabody, both of MA (US); Cornelius Harm Dykhuizen, West Chester, OH (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 09/652,179

(22) Filed: Aug. 31, 2000

(51) Int. Cl.$^7$ ................................................. F02C 7/20
(52) U.S. Cl. ........................ 60/226.1; 60/797; 244/54; 248/555
(58) Field of Search ............................ 60/39.31, 226.1, 60/797; 244/54; 248/555, 556

(56) References Cited

U.S. PATENT DOCUMENTS

| | | | | |
|---|---|---|---|---|
| 2,753,140 A | * | 7/1956 | Hasbrouk et al. | 248/555 |
| 2,949,268 A | * | 8/1960 | Eggers et al. | 248/555 |
| 3,809,340 A | * | 5/1974 | Dolgy et al. | 244/54 |
| 3,952,973 A | * | 4/1976 | James | 244/54 |
| 4,266,741 A | * | 5/1981 | Murphy | 244/54 |
| 5,127,606 A | * | 7/1992 | Chan et al. | 244/54 |
| 5,452,575 A | | 9/1995 | Fried | 60/39.31 |
| 5,746,391 A | * | 5/1998 | Rodgers et al. | 244/54 |
| 5,860,275 A | * | 1/1999 | Nweton et al. | 60/39.31 |

* cited by examiner

Primary Examiner—Louis J. Casaregola
(74) Attorney, Agent, or Firm—Nathan D. Herkamp; Pierce Atwood (57) ABSTRACT

A system for mounting an aircraft engine to an aircraft includes four forward mounting features, two mid mounting features, and four aft mounting features disposed on the engine. The forward, mid and the aft mounting features, respectively, are equally spaced circumferentially about the engine. The method of mounting the engine includes connecting the first and fourth forward mounting features to mounting structure, the first and fourth aft mounting features to mounting structure, and the first and second mid mounting features to mounting structure when the aircraft engine is used in a top mounted installation. Alternatively, the first and second forward mounting features, the first and second aft mounting features, and the first mid mounting feature are connected to mounting structure when the aircraft engine is used in a first side mounted installation; or the third and fourth forward mounting features, the third and fourth aft mounting features, and the second mid mounting feature are connected to mounting structure when the aircraft engine is used in a second side mounted installation. Another arrangement includes connecting the second and third forward mounting features, the second and third aft mounting features, and the first and second mid mounting features to mounting structure when the aircraft engine is used in a bottom mounted installation.

22 Claims, 6 Drawing Sheets

SYSTEM FOR MOUNTING AIRCRAFT ENGINES

BACKGROUND OF THE INVENTION

This invention relates generally to aircraft engines and more particularly to mounting such engines to aircraft.

An aircraft engine may be mounted to an aircraft at various locations such as the wings, fuselage or tail. The engine is typically mounted at both its forward and aft ends by corresponding forward and aft mounting structure for carrying various loads to the aircraft. The loads typically include vertical loads such as the weight of the engine itself, axial loads due to the thrust generated by the engine, lateral loads such as those due to wind buffeting, and roll loads or moments due to rotary operation of the engine. The mounting structure must also accommodate both axial and radial thermal expansion and contraction of the engine relative to the supporting structure.

Depending on whether it is to be mounted to an aircraft wing, fuselage or tail, an engine can be top, side or bottom mounted, respectively. In a top mounted installation, the engine is suspended from an overhead portion of the aircraft, such as a pylon extending below an aircraft wing, by forward and aft mounts that extend downwardly from the pylon and connect with an upper portion of the engine. In a side mounted installation, forward and aft mounts extend laterally from a portion of the aircraft, such as the fuselage, to connect to a side portion of the engine. And in a bottom mounted installation, the forward and aft mounts extend upwardly from the aircraft to connect to a bottom portion of the engine.

The forward and aft mounts are connected to the engine via mounting features, such as lugs, that are formed on various stationary structures of the engine. These mounting features are typically tailored for a particular type of installation; for example, the mounting features would be formed on the top portion of an engine designed for a top mounted installation. Thus, using a particular engine design with an aircraft requiring a different installation than the engine was designed for would require significant engine redesign to incorporate different engine mounting features. The redesign effort will result in significant cost and program schedule impacts.

Accordingly, it would be desirable to have a system and method for mounting engines to aircraft that could accommodate different types of engine installations without costly redesigns.

BRIEF SUMMARY OF THE INVENTION

The above-mentioned need is met by the present invention which provides a system for mounting an aircraft engine to an aircraft. The mounting system includes four forward mounting features, two mid mounting features, and four aft mounting features disposed on the engine. The forward, mid and the aft mounting features, respectively, are equally spaced circumferentially about the engine. The method of mounting the engine includes connecting the first and fourth forward mounting features to mounting structure, the first and fourth aft mounting features to mounting structure, and the first and second mid mounting features to mounting structure when the aircraft engine is used in a top mounted installation. Alternatively, the first and second forward mounting features, the first and second aft mounting features, and the first mid mounting feature are connected to mounting structure when the aircraft engine is used in a first side mounted installation; or the third and fourth forward mounting features, the third and fourth aft mounting features, and the second mid mounting feature are connected to mounting structure when the aircraft engine is used in a second side mounted installation. Another arrangement includes connecting the second and third forward mounting features, the second and third aft mounting features, and the first and second mid mounting features to mounting structure when the aircraft engine is used in a bottom mounted installation.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
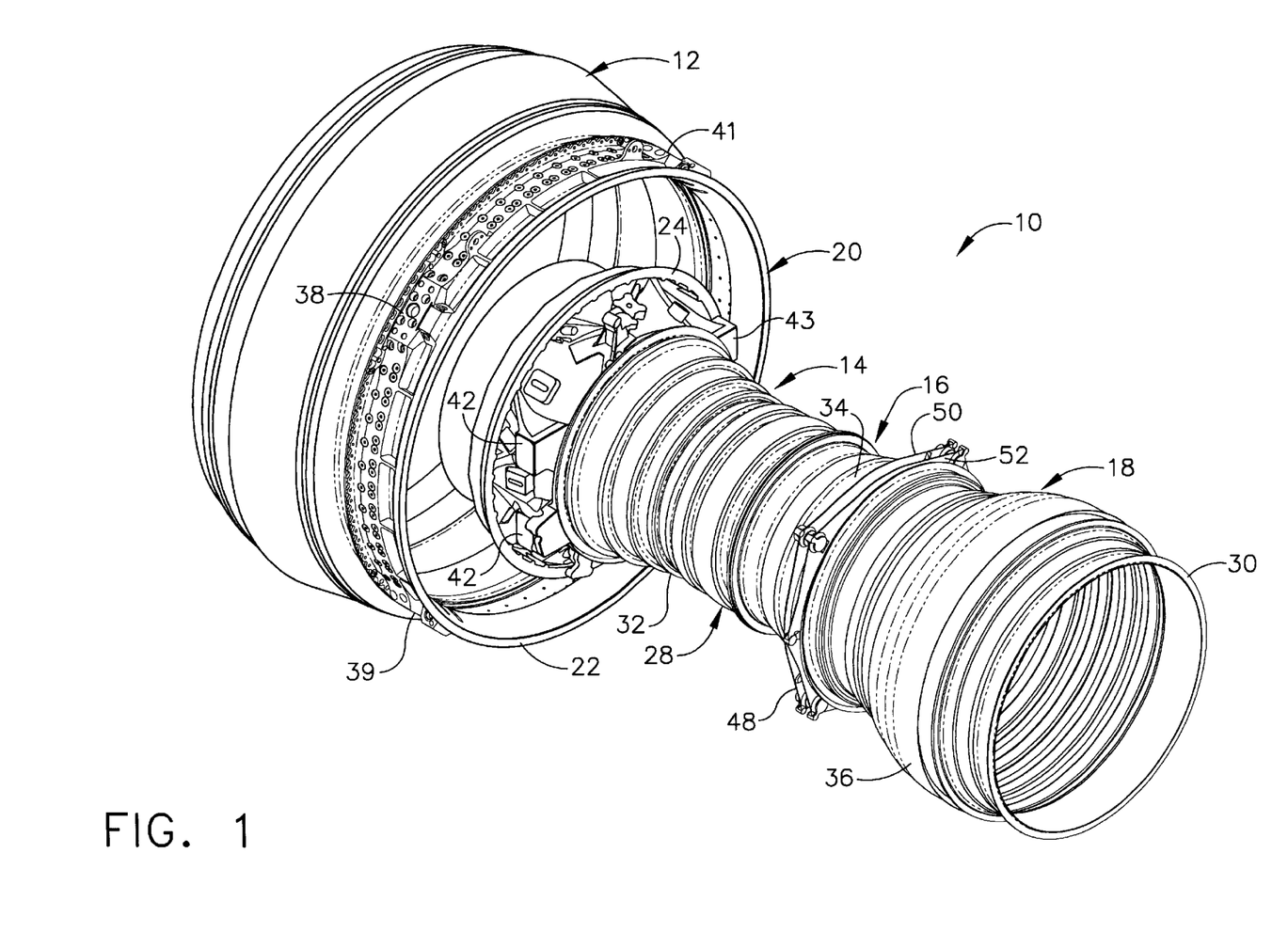
FIG. 1 is a perspective view of an aircraft engine having a mounting system of the present invention.

Referring to the drawings wherein identical reference numerals denote the same elements throughout the various views, FIG. 1 shows a turbofan gas turbine engine 10 that can be used for powering an aircraft in flight. As is known in the art, the engine 10 includes a fan section 12, a compressor section 14, a combustor section 16 and a turbine section 18, arranged in order, in axial flow relationship. The compressor section 14, combustor section 16 and turbine section 18 are commonly referred to collectively as the core engine. A portion of the air entering the engine 10 passes through the fan section 12 and the compressor section 14, and is pressurized in each section. The compressed air exiting the compressor section 14 enters the combustor section 16 where it is mixed with fuel and burned to provide a high energy gas stream. This high energy gas stream is expanded in the turbine section 18. The energy extracted by the expansion of the high energy gas stream in the turbine section 18 is used to drive the fan section 12 and the compressor section 14. The remainder of the air flow entering the engine 10 passes through the fan section 12, but bypasses the core engine, and produces a large portion of the engine thrust.

The fan section 12 includes a plurality of fan blades (not shown) that extend radially outwardly from a rotor disk (not shown). The rotor disk is rotatively supported on a stationary front frame 20 (also known as a fan frame). The front frame 20 includes an annular fan casing 22, an inner hub 24 and a plurality of circumferentially spaced apart struts (not shown for clarity) extending therebetween. The struts are airfoil shaped because bypass air passes through adjacent ones thereof. A core engine casing 28 extends from the inner hub 24 to a stationary rear turbine frame 30. The core engine casing 28 comprises a compressor casing 32, a combustor casing 34 and a turbine casing 36.

Figure 2:
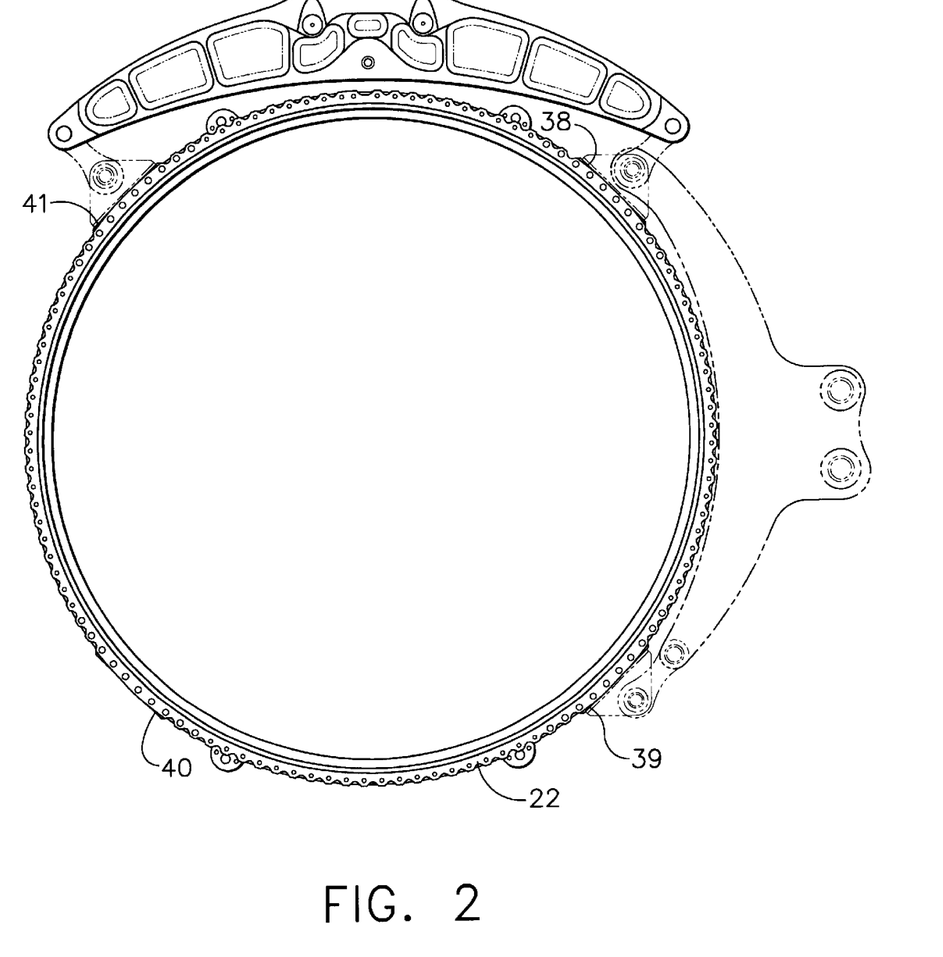
FIG. 2 is a cross-sectional view of the aircraft engine of FIG. 1, taken along its forward mounting plane.
Figure 3:
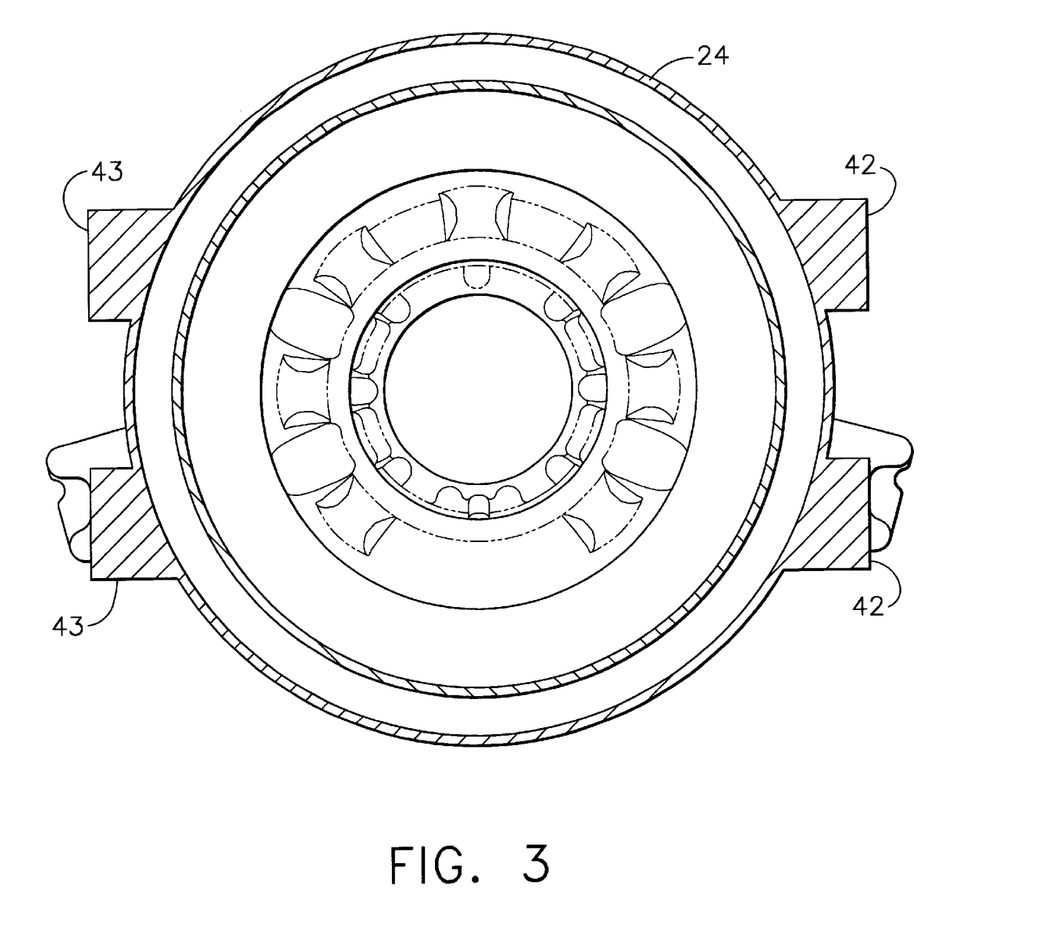
FIG. 3 is a cross-sectional view of the aircraft engine of FIG. 1, taken along its mid mounting plane.
Figure 4:
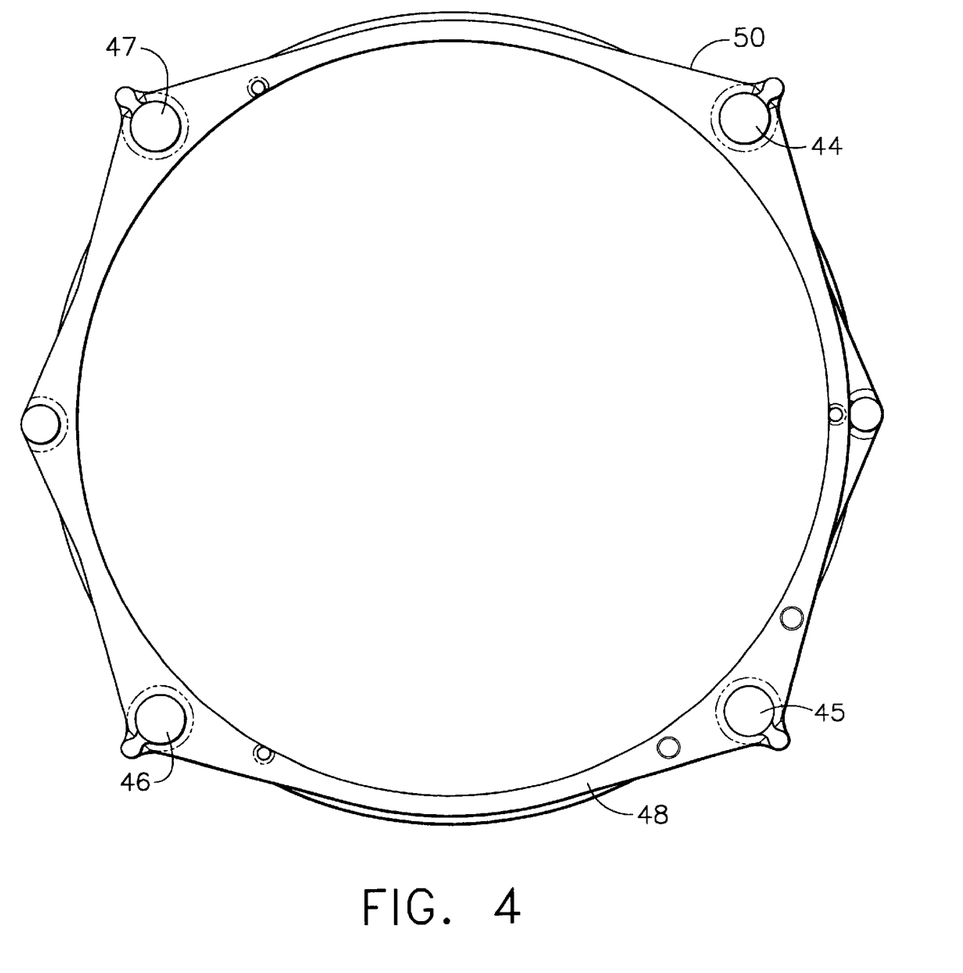
FIG. 4 is a cross-sectional view of the aircraft engine of FIG. 1, taken along its aft mounting plane.

Referring now to FIGS. 2–4, as well as FIG. 1, it is seen that the engine 10 has first, second, third and fourth forward mounting features 38–41, first and second mid mounting features 42 and 43, and first, second, third and fourth aft mounting features 44–47 disposed thereon. The forward mounting features 38–41 are disposed on the fan casing 22 in a forward mounting plane that is substantially perpendicular to the centerline axis of the engine 10. The four forward mounting features 38–41 are equally spaced circumferentially about the fan casing 22, wherein the first forward mounting feature 38 is located 45 degrees from top dead center of the engine 10, the second forward mounting feature 39 is located 135 degrees from top dead center, the third forward mounting feature 40 is located 225 degrees from top dead center, and the fourth forward mounting feature 41 is located 315 degrees from engine top dead center. As used herein, the term "top dead center" refers to the point on the circumference of the engine 10 that is situated at the highest vertical location (i.e., "twelve o'clock") when the engine 10 is properly mounted. Accurate clocking of the engine 10 facilitates proper operation of oil sumps and various engine accessories. In one embodiment, each of the four forward mounting features 38–41 is a pad machined into the fan casing 22 and capable of having mounting structure bolted thereto. Alternative types of mounting features could also be used. For example, each forward mounting feature could be a clevis integrally formed on the fan casing 22.

The mid mounting features 42 and 43 are disposed on the inner hub 24 in a mid mounting plane that is substantially perpendicular to the centerline axis of the engine 10. The two mid mounting features 42 and 43 are equally spaced circumferentially about the inner hub 24, wherein the first mid mounting feature 42 is located 90 degrees from top dead center of the engine 10 and the second mid mounting feature 43 is located 270 degrees from engine top dead center. In one embodiment, both of the mid mounting features 42 and 43 are pads machined into the inner hub 24 and capable of having mounting structure bolted thereto. Again, alternative types of mounting features could be used here.

The aft mounting features 44–47 are disposed on the combustor casing 34 in an aft mounting plane that is substantially perpendicular to the centerline axis of the engine 10. The aft mounting features 44–47 alternatively could be disposed on other aft engine structure such as the turbine casing 36 or the rear turbine frame 30. The four aft mounting features 44–47 are equally spaced circumferentially about the combustor casing 34, wherein the first aft mounting feature 44 is located 45 degrees from top dead center of the engine 10, the second aft mounting feature 45 is located 135 degrees from top dead center, the third aft mounting feature 46 is located 225 degrees from top dead center, and the fourth aft mounting feature 47 is located 315 degrees from engine top dead center. In one embodiment, the four aft mounting features 44–47 are incorporated into a cylindrical ring 48 that is mounted around the combustor case 34. The ring 48 has a pair of annular ribs 50 and 52 formed thereon that are spaced apart axially. Each rib 50 and 52 has four lugs formed thereon, wherein each one of the lugs on the first rib 50 is circumferentially aligned with a corresponding one of the lugs on the second rib 52 to define the four aft mounting features 44–47. Each pair of lugs is adapted to receive a pin therethrough for connecting mounting structure thereto. Alternative mounting features could also be used.

Figure 5:
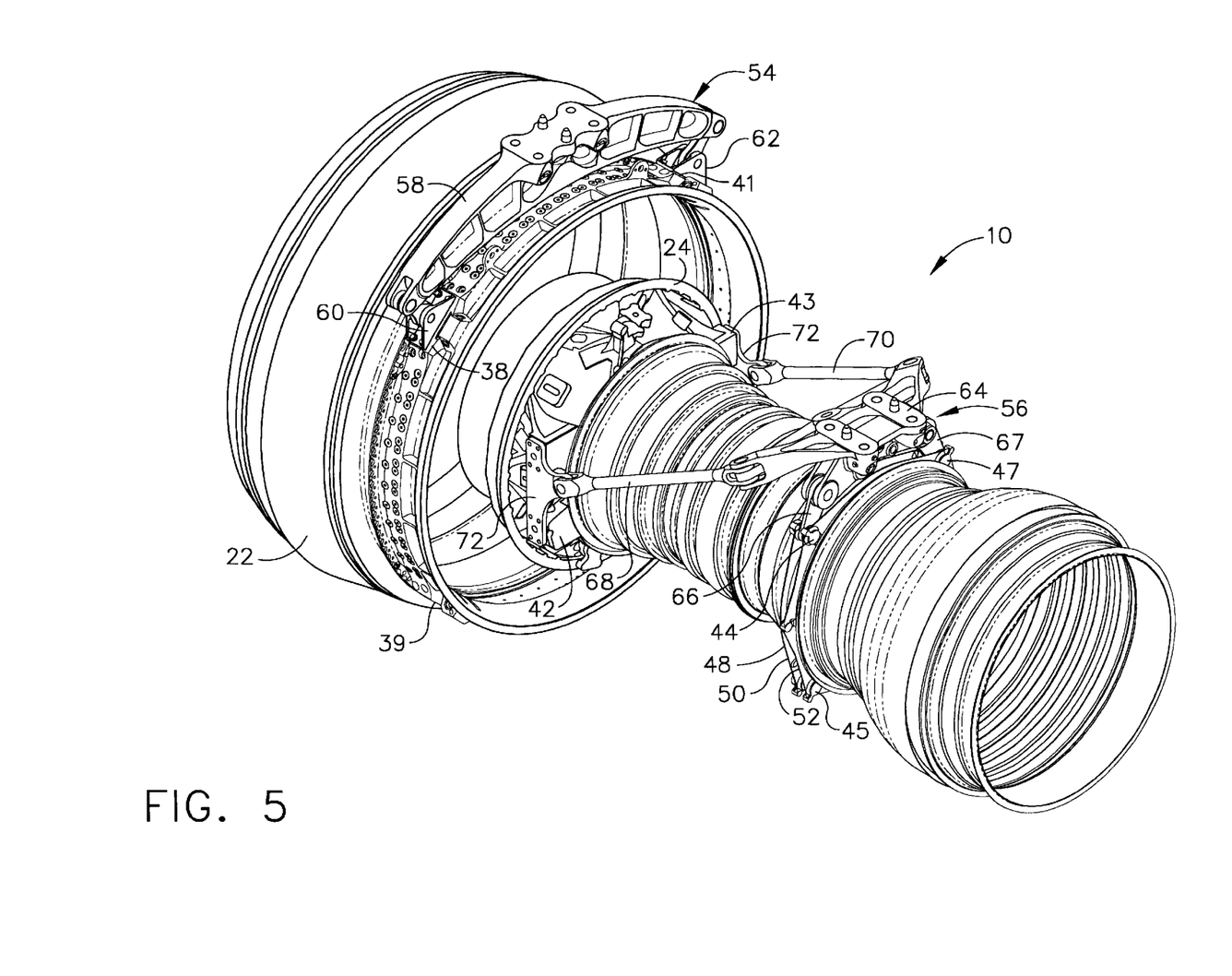
FIG. 5 is a perspective view of the aircraft engine of FIG. 1 in a top mounted installation.

Turning now to FIG. 5, the engine 10 is shown in a top mounted installation, in which mounting structure is used to mount the engine 10 below aircraft structure such as an aircraft wing pylon (not shown). The mounting structure comprises a forward mount 54 and an aft mount 56 located downstream from the forward mount 54, although other types of mounting structure could alternatively be used. The forward mount 54 includes a mounting frame 58 that is fixedly joined to the pylon by conventional means such as bolts. A first triangular clevis 60 is pivotally joined to one end of the forward mounting frame 58, and a second triangular clevis 62 is pivotally joined to the other end of the forward mounting frame 58. The first triangular clevis 60 is fixedly joined to the fan casing 22 at the first forward mounting feature 38, and the second triangular clevis 62 is fixedly joined to the fan casing 22 at the fourth forward mounting feature 41.

The aft mount 56 includes a mounting frame 64 that is fixedly joined to the pylon by conventional means such as bolts. A first link 66 is joined at one end to the aft mounting frame 64 and is joined at the other end to the first aft mounting feature 44. A second link 67 is similarly joined at one end to the aft mounting frame 64 and joined at the other end to the fourth aft mounting feature 47. The aft mount 56 further includes first and second thrust links 68 and 70 for reacting thrust generated by the engine 10. The first thrust link 68 is joined at one end to a first corner of the aft mounting frame 64 and is joined at the other end to a bracket 72. The bracket 72 is fixedly joined to the inner hub 24 at the first mid mounting feature 42. The second thrust link 70 is joined at one end to a second corner of the aft mounting frame 64 and is joined at the other end to a second bracket 72. The second bracket 72 is fixedly joined to the inner hub 24 at the second mid mounting feature 43 in the same manner that the first bracket 72 is joined to the first mid mounting feature 42.

With this arrangement, engine vertical, lateral and roll loads are reacted through the engaged forward and aft mounting features (i.e., the first and fourth forward mounting features 38 and 41 and the first and fourth aft mounting features 44 and 47). Axial engine loads are reacted through two mid mounting features 42 and 43.

Figure 6:
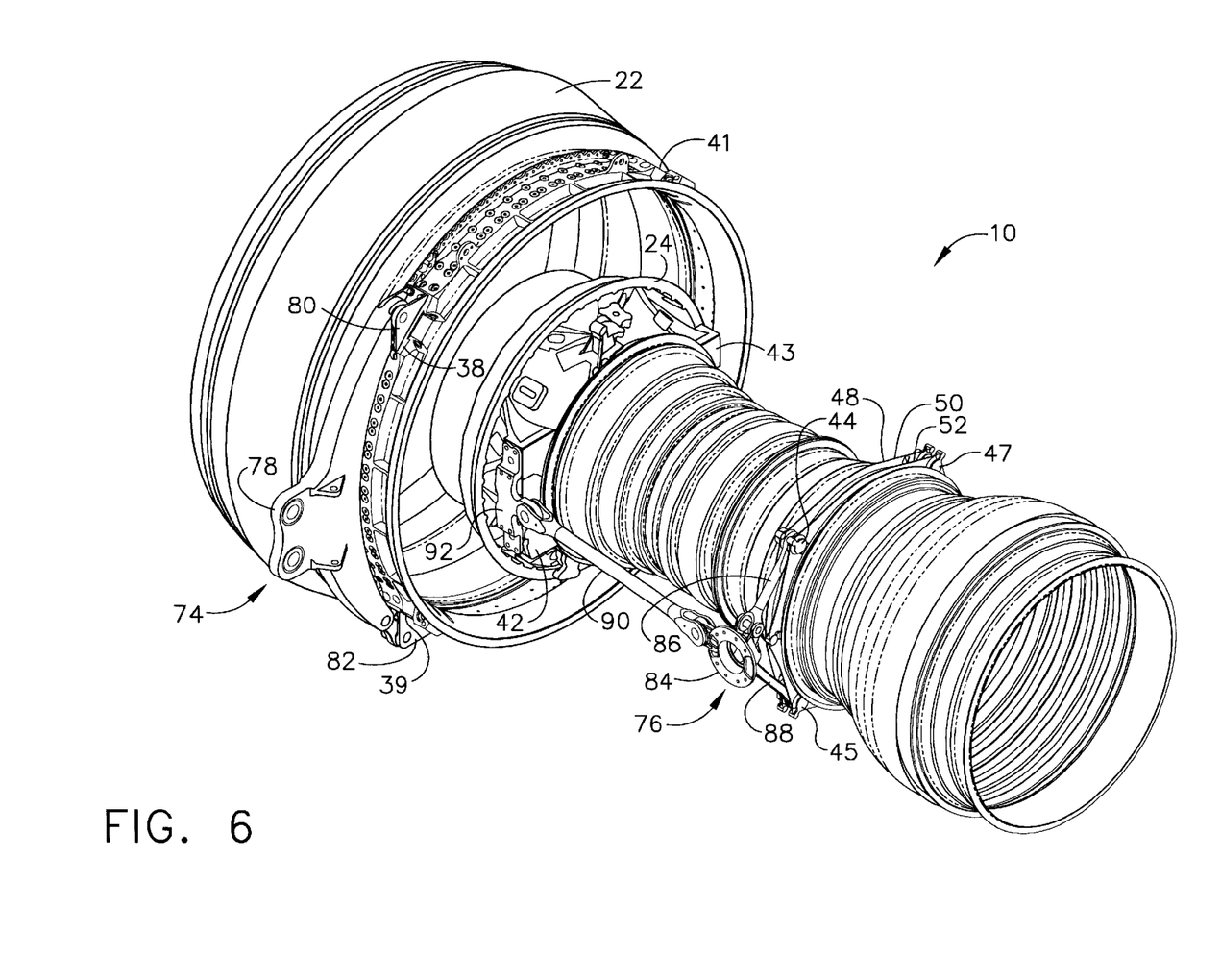
FIG. 6 is a perspective view of the aircraft engine of FIG. 1 in a side mounted installation.

In comparison, FIG. 6 shows the engine 10 in a side mounted installation, in which mounting structure is used to mount the engine 10 next to aircraft structure such as the fuselage (not shown). The mounting structure comprises a forward mount 74 and an aft mount 76 located downstream from the forward mount 74, although other types of mounting structure could alternatively be used. The forward mount 74 includes a mounting frame 78 that is fixedly joined to the aircraft by conventional means such as bolts. A first triangular clevis 80 is pivotally joined to one end of the forward mounting frame 78, and a second triangular clevis 82 is pivotally joined to the other end of the forward mounting frame 78. The first triangular clevis 80 is fixedly joined to the fan casing 22 at the first forward mounting feature 38, and the second triangular clevis 82 is fixedly joined to the fan casing 22 at the second forward mounting feature 39.

The aft mount 76 also includes a mounting frame 84 that is joined to the aircraft by conventional means such as bolts. A first link 86 is joined at one end to the aft mounting frame 84 and is joined at the other end to the first aft mounting feature 44. A second link 88 is similarly joined at one end to the aft mounting frame 84 and joined at the other end to the second aft mounting feature 45. The aft mount 76 further includes a thrust link 90 for reacting thrust generated by the engine 10. The thrust link 90 is joined at one end to the aft mounting frame 84 and is joined at the other end to a bracket 92. The bracket 92 is fixedly joined to the inner hub 24 at the first mid mounting feature 42.

Although not shown in the drawings, it should be readily understood from the foregoing description that the engine 10 could also be mounted in a side mounted installation on the opposite side of an aircraft from what is shown in FIG. 6. In this case, the forward mounting structure would be joined to the fan casing 22 at the third and fourth forward mounting features 40 and 41, the aft mounting structure would be joined to the engine 10 at the third and fourth aft mounting features 46 and 47, and the thrust reacting structure would be joined to the second mid mounting feature 43.

Furthermore, the engine 10 could be mounted in a bottom mounted installation, in which the engine 10 is mounted above aircraft structure such as an aircraft tail. In this case, the forward mounting structure would be joined to the fan casing 22 at the second and third forward mounting features 39 and 40, the aft mounting structure would be joined to the engine 10 at the second and third aft mounting features 45 and 46, and the thrust reacting structure would be joined to the first and second mid mounting features 42 and 43. Thus, the engine 10 is able to accommodate top, right side, left side or bottom mounted installations without being redesigned.

The foregoing has described an improved system and method for mounting aircraft engines. The present invention provides the advantage of allowing a single engine design to be used with any type of engine installation, thereby increasing the engine's compatibility with a large number of aircraft while avoiding costly redesigns.

While specific embodiments of the present invention have been described, it will be apparent to those skilled in the art that various modifications thereto can be made without departing from the spirit and scope of the invention as defined in the appended claims.

What is claimed is:

1. A mounting system for an aircraft engine, said mounting system comprising:
    first, second, third and fourth forward mounting features disposed on said engine, said forward mounting features being equally spaced circumferentially about said engine;
    first and second mid mounting features disposed on said engine, said mid mounting features being equally spaced circumferentialy about said engine; and
    first, second, third and fourth aft mounting features disposed on said engine, said aft mounting features being equally spaced circumferentially about said engine.

2. The mounting system of claim 1 wherein said first and fourth forward mounting features engage mounting structure, said first and fourth aft mounting features engage mounting structure, and said first and second mid mounting features engage mounting structure when said aircraft engine is used in a top mounted installation.

3. The mounting system of claim 1 wherein said first and second forward mounting features engage mounting structure, said first and second aft mounting features engage mounting structure, and said first mid mounting feature engages mounting structure when said aircraft engine is used in a side mounted installation.

4. The mounting system of claim 1 wherein said third and fourth forward mounting features engage mounting structure, said third and fourth aft mounting features engage mounting structure, and said second mid mounting feature engages mounting structure when said aircraft engine is used in a side mounted installation.

5. The mounting system of claim 1 wherein said second and third forward mounting features engage mounting structure, said second and third aft mounting features engage mounting structure, and said first and second mid mounting features engage mounting structure when said aircraft engine is used in a bottom mounted installation.

6. The mounting system of claim 1 wherein said first forward mounting feature is located 45 degrees from engine top dead center, said second forward mounting feature is located 135 degrees from engine top dead center, said third forward mounting feature is located 225 degrees from engine top dead center, and said fourth forward mounting feature is located 315 degrees from engine top dead center.

7. The mounting system of claim 1 wherein said first mid mounting feature is located 90 degrees from engine top dead center and said second mid mounting feature is located 270 degrees from engine top dead center.

8. The mounting system of claim 1 wherein said first aft mounting feature is located 45 degrees from engine top dead center, said second aft mounting feature is located 135 degrees from engine top dead center, said third aft mounting feature is located 225 degrees from engine top dead center, and said fourth aft mounting feature is located 315 degrees from engine top dead center.

9. The mounting system of claim 1 wherein each one of said forward mounting features is a pad machined into said engine.

10. The mounting system of claim 1 wherein each one of said aft mounting features comprises a pair of lugs formed on a ring that is disposed around said engine.

11. The mounting system of claim 1 wherein each one of said mid mounting features is a pad machined into said engine.

12. A mounting system for an aircraft engine having a fan casing, a front frame inner hub and a combustor casing, said mounting system comprising:
    first, second, third and fourth forward mounting features disposed on said fan casing, said forward mounting features being equally spaced circumferentially about said fan casing;
    first and second mid mounting features disposed on said inner hub, said mid mounting features being equally spaced circumferentially about said inner hub; and
    first, second, third and fourth aft mounting features disposed on said combustor casing, said aft mounting features being equally spaced circumferentially about said combustor casing.

13. The mounting system of claim 12 wherein said first and fourth forward mounting features engage mounting structure, said first and fourth aft mounting features engage mounting structure, and said first and second mid mounting features engage mounting structure when said aircraft engine is used in a top mounted installation.

14. The mounting system of claim 12 wherein said first and second forward mounting features engage mounting structure, said first and second aft mounting features engage mounting structure, and said first mid mounting feature engages mounting structure when said aircraft engine is used in a side mounted installation.

15. The mounting system of claim 12 wherein said third and fourth forward mounting features engage mounting structure, said third and fourth aft mounting features engage mounting structure, and said second mid mounting feature engages mounting structure when said aircraft engine is used in a side mounted installation.

16. The mounting system of claim 12 wherein said second and third forward mounting features engage mounting structure, said second and third aft mounting features engage mounting structure, and said first and second mid mounting features engage mounting structure when said aircraft engine is used in a bottom mounted installation.

17. The mounting system of claim 12 wherein said first forward mounting feature is located 45 degrees from engine top dead center, said second forward mounting feature is located 135 degrees from engine top dead center, said third forward mounting feature is located 225 degrees from engine top dead center, and said fourth forward mounting feature is located 315 degrees from engine top dead center.

18. The mounting system of claim 12 wherein said first mid mounting feature is located 90 degrees from engine top dead center and said second mid mounting feature is located 270 degrees from engine top dead center.

19. The mounting system of claim 12 wherein said first aft mounting feature is located 45 degrees from engine top dead center, said second aft mounting feature is located 135 degrees from engine top dead center, said third aft mounting feature is located 225 degrees from engine top dead center, and said fourth aft mounting feature is located 315 degrees from engine top dead center.

20. The mounting system of claim 12 wherein each one of said forward mounting features is a pad machined into said fan casing.

21. The mounting system of claim 12 further comprising a ring disposed around said combustor casing, said ring having first and second annular ribs formed thereon, wherein each one of said aft mounting features comprises a lug formed on said first rib and a corresponding lug formed on said second rib.

22. The mounting system of claim 12 wherein each one of said mid mounting features is a pad machined into said inner hub.

* * * * *